United States Patent
Hamilton et al.

(10) Patent No.: US 11,874,150 B2
(45) Date of Patent: Jan. 16, 2024

(54) WATER METER ASSEMBLY WITH TAPER FOR MINIMIZING HEAD LOSS

(71) Applicant: Neptune Technology Group Inc., Tallassee, AL (US)

(72) Inventors: David Hamilton, Auburn, AL (US); Mahesh K. Matam, Cumming, GA (US); Jeffrey M. Fowler, Lawrenceville, GA (US); John R. Scarborough, III, Auburn, AL (US)

(73) Assignee: NEPTUNE TECHNOLOGY GROUP INC., Tallassee, AL (US)

( * ) Notice: Subject to any disclaimer, the term of this patent is extended or adjusted under 35 U.S.C. 154(b) by 383 days.

(21) Appl. No.: 17/221,961

(22) Filed: Apr. 5, 2021

(65) Prior Publication Data

US 2021/0333138 A1    Oct. 28, 2021

Related U.S. Application Data

(60) Provisional application No. 63/016,485, filed on Apr. 28, 2020.

(51) Int. Cl.
  *G01F 1/66* (2022.01)
  *G01N 29/22* (2006.01)
  *G01N 29/02* (2006.01)

(52) U.S. Cl.
  CPC .......... *G01F 1/662* (2013.01); *G01N 29/222* (2013.01); *G01N 29/02* (2013.01); *G01N 29/223* (2013.01)

(58) Field of Classification Search
  CPC ........ G01F 1/662; G01F 15/185; G01F 1/667; G01N 29/222; G01N 29/02; G01N 29/223
  See application file for complete search history.

(56) References Cited

U.S. PATENT DOCUMENTS

| | | | |
|---|---|---|---|
| 2,944,420 A | 7/1960 | Streeter | |
| 3,736,797 A | 6/1973 | Brown | |
| 3,788,140 A * | 1/1974 | Turtle | G01F 1/00 73/861.28 |
| 5,728,948 A * | 3/1998 | Bignell | G01F 1/662 73/861.28 |
| 7,676,858 B2 | 3/2010 | Halloran et al. | |
| 7,810,401 B2 * | 10/2010 | Brown | G01F 1/662 73/861.63 |
| 2014/0352453 A1 * | 12/2014 | Sonnenberg | G01F 15/185 73/204.11 |

(Continued)

FOREIGN PATENT DOCUMENTS

| | | |
|---|---|---|
| CN | 1330944 C | 8/2007 |
| CN | 202323898 U | 7/2012 |

(Continued)

*Primary Examiner* — Benjamin R Schmitt
(74) *Attorney, Agent, or Firm* — Snyder, Clark, Lesch & Chung, LLP

(57) ABSTRACT

Systems and methods described herein provide a water meter assembly with a transition interface that includes a non-linear taper to minimize head loss. According to one implementation, the transition interface may include a non-linear outlet taper. In another implementation, the transition interface may include a non-linear inlet taper and a non-liner outlet taper. In still other implementations, the water meter assembly may include a transition interface with different outlet and inlet tapers.

20 Claims, 11 Drawing Sheets

(56) References Cited

U.S. PATENT DOCUMENTS

2018/0299305 A1* 10/2018 Starke .................... G01F 1/662

FOREIGN PATENT DOCUMENTS

| CN | 103674135 A | 3/2014 |
| CN | 207109722 U | 3/2018 |
| EP | 2759808 A1 | 7/2014 |
| NL | 8204718 A | 7/1984 |

* cited by examiner

WATER METER ASSEMBLY WITH TAPER FOR MINIMIZING HEAD LOSS

CROSS REFERENCE TO RELATED APPLICATION

This application claims priority under 35 U.S.C. § 119, based on U.S. Provisional Patent Application No. 63/016,485 filed Apr. 28, 2020, titled "Water Meter Assembly with Taper for Minimizing Head Loss," the disclosure of which is hereby incorporated by reference.

BACKGROUND OF THE INVENTION

The present application relates generally to water meters and more specifically to water meters that use measuring channels with reduced cross-sectional areas for flow measurements.

Water meters are typically used to measure water usage at a consumption site for billing and/or monitoring purposes. Water meter measurements are directly tied to revenue, which makes measurement integrity and reliability of every water meter a high priority. Water meters may be installed in-line with a piping system. To provide accurate readings at low flow rates, the cross-sectional area of the flow through the water meter is typically smaller than the cross-sectional area of the pipes leading to and from the water meter.

DETAILED DESCRIPTION OF THE PREFERRED EMBODIMENTS

Figure 1:
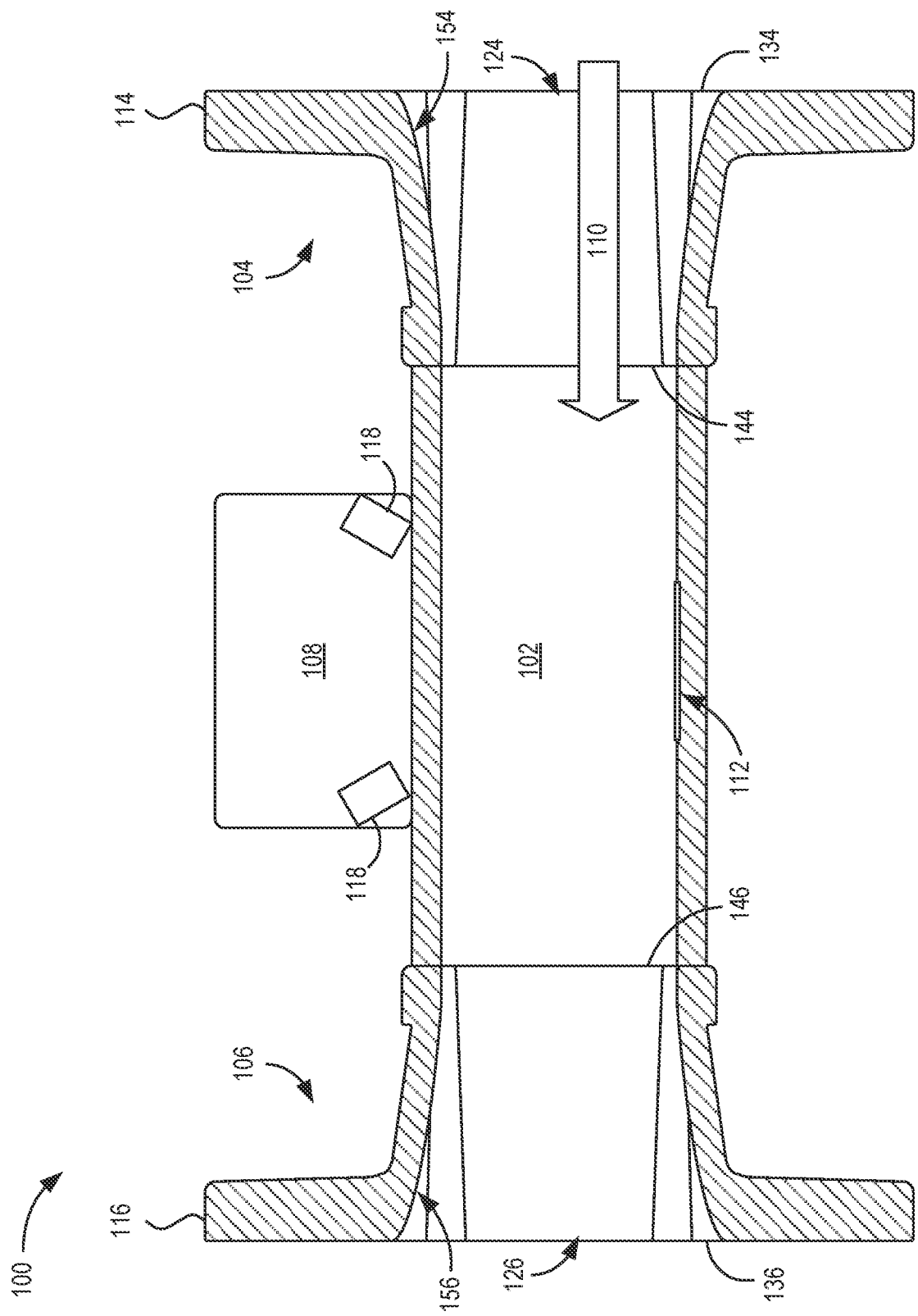
FIG. 1 is a longitudinal cross-sectional view of a water meter assembly according to an implementation.

The following detailed description refers to the accompanying drawings. The same reference numbers in different drawings identify the same or similar elements.

To improve accuracy at low flow rates, water meters, and particularly solid state ultrasonic water meters, may use relatively small cross-sectional areas though the measuring element of the water meter. The small cross-sectional area, relative to the standard water system piping, may provide higher velocity flow through the meter and provide increased accuracy for low flows. The transition into and out of the small cross-sectional area of a water meter may cause head loss. Head loss (or pressure drop) may be considered a representation of the power required to push water through a water meter or other in-line elements of a piping system (e.g., bends, transitions, screens, valves, etc.). That is, for a required water meter outlet pressure, the inlet pressure must exceed the outlet pressure by at least the amount of head loss. Thus, head loss through the water meter is typically a design parameter that cannot exceed a specified maximum. The effective measuring range of a water meter can be improved by maximizing the difference between the cross-sectional areas through the measuring element and the system piping while not exceeding the maximum head loss.

Head loss in the water meter assembly can be affected by the shape of the transitions between different pipe sizes (e.g., from a larger cross-section to a smaller cross-section on an inlet side of the water meter, and from the smaller cross-section back to the larger cross-section on an outlet side). The shape of the transitions may be referred to herein generally as a "taper," with the transition on the inlet side of the water meter being referred to as an "inlet taper" and the transition on the outlet side of the water meter being referred to as an "outlet taper." According to implementations described herein, a taper can be optimized to minimize the head loss for a water meter assembly.

In some traditional systems, a linear taper is used to transition between different pipe diameters. This linear taper does not provide the lowest head loss, particularly in a water meter assembly that transitions to a smaller diameter and back to the original larger diameter associated with the water system piping.

Systems and methods described herein provide a water meter assembly with a transition interface that includes a non-linear taper to minimize head loss. According to one implementation, the transition interface may include a non-linear outlet taper. In another implementation, the transition interface may include a non-linear inlet taper and a non-liner outlet taper. In still other implementations, the water meter assembly may include a transition interface with a different outlet taper and inlet taper. According to still another implementation, the transition interfaces described herein may be used with vortex generators situated upstream of the outlet taper to further minimize the head loss for the water meter assembly.

FIG. 1 is a longitudinal cross-sectional view of a water meter assembly 100. A measuring channel 102 is positioned between two parts of a transition interface, an inlet section 104 and an outlet section 106. An electronics module 108 may include ultrasonic transducers 118 and other equipment to measure the flow rate of water through measuring channel 102. For example, in one implementation electronics module 108 may include one or more pairs of ultrasonic transducers 118 for measuring a flow of a fluid flowing through measuring channel 102. The ultrasonic transducers 118 may, for example, direct signals off a reflective surface 112 opposite electronics module 108 to detect flow. In some implementations, measuring channel 102 may include transducer pockets or sensors (not shown) in the walls of measuring channel 102.

Water meter assembly 100 may be dimensioned to fit inline within a selected pipe system (e.g., a particular pipe diameter). An inlet flange 114 of inlet section 104 may be bolted, for example, to a corresponding flange (not shown) of the piping system, and an outlet flange 116 of outlet section 106 may be bolted, for example, to another corresponding flange (not shown) of the piping system, such that water flows through water meter assembly 100 in a desired flow direction, shown as arrow 110.

As shown in FIG. 1, an inlet channel 124 extends from an end 134 at input flange 114 to an end 144 of measuring channel 102. Similarly, an outlet channel 126 extends from an opposite end 146 of measuring channel 102 to an end 136 at outlet flange 116. Inlet channel 124 and outlet channel 126 may effectively adjust the cross-sectional shape (i.e., the shape substantially orthogonal to the flow direction 110) of the fluid flow path from the original pipe system diameter to the smaller cross-sectional area of measuring channel 102. At end 134, inlet channel 124 may have a circular cross-section to match the main water system piping. Similarly, at the opposite end 136, outlet channel 126 may also have a circular cross-section. Measuring channel 102 may have a substantially circular cross-section, a substantially rectangular cross-section, or another cross-sectional shape. Thus, in some implementations, inlet channel 124 and outlet channel 126 may transition between a larger circular cross-section and a smaller non-circular cross-section (e.g., a substantially rectangular cross-section). In other implementations, inlet channel 124 and outlet channel 126 may transition between a larger circular cross-section and a smaller circular cross-section.

According to one implementation, the ratio of the cross-sectional area of inlet channel 124 at end 134 to the cross-sectional area of inlet channel 124 at end 144 may be about 2-to-1. Similarly, the cross-sectional area of outlet channel 126 at end 136 to the cross-sectional area of outlet channel 126 at end 146 may also have a 2-to-1 ratio. In other implementations, other ratios (e.g., 1.5-to-1, 2.5 to 1, etc.) may be used. Outlet channel 126 may include a gradual transition between end 146 and end 136. As described further herein, the gradual transition may be implemented using a non-linear taper 156 that extends longitudinally from end 146 to end 136. Similarly, in some implementations and as shown in FIG. 1, inlet channel 124 may include a gradual transition between end 134 and end 144. As described further herein, the gradual transition may be implemented using a non-linear taper 154 that extends longitudinally from end 134 to end 144. The design of the tapers 154 and/or 156 may reduce head loss through measuring channel 102.

According to an implementation, inlet section 104 and outlet section 106 may be cast components (e.g., bronze, stainless steel, etc.). Measuring channel 102 may be integral with inlet section 104 and/or outlet section 106. Alternatively, measuring channel 102 may be provided as a separate component. For example, in one implementation, inlet section 104 and outlet section 106 may be included as part of a casing into which measuring channel 102 may be inserted (and later removed for maintenance, replacement, etc.). In other implementations, inlet section 104 and outlet section 106 may be separate pieces that are attached to measuring channel 102.

Figure 2A:
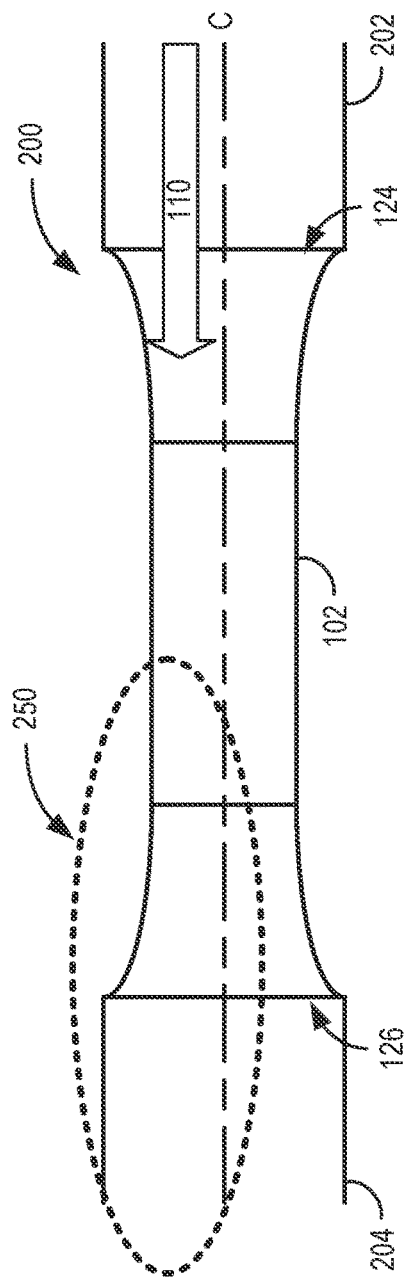
FIGS. 2A and 2B are illustrations of a flow path geometry for the water meter assembly of FIG. 1.
Figure 2B:
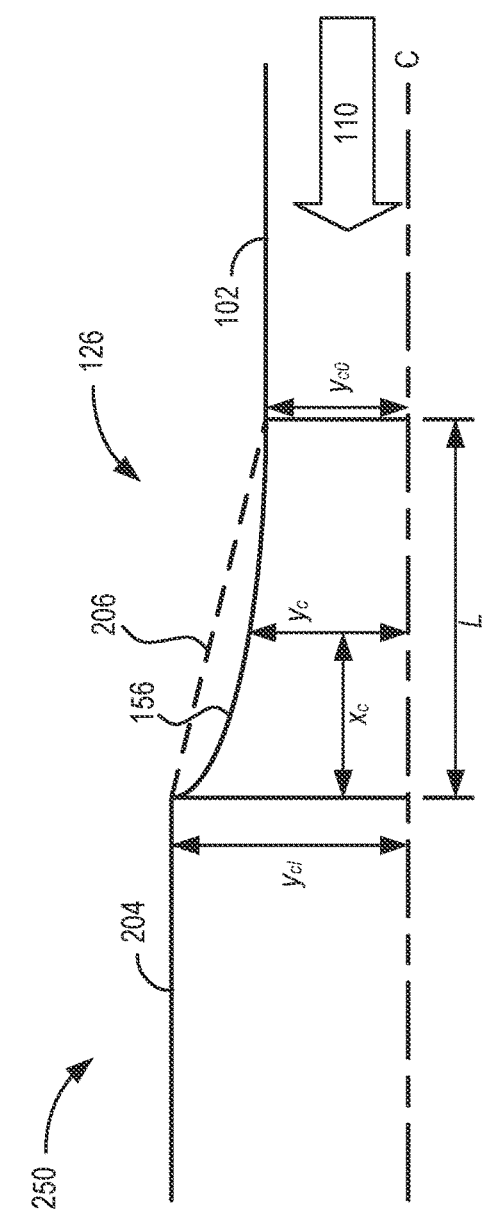

FIG. 2A is a two-dimensional (2D) illustration of a flow path geometry 200 for water meter assembly 100 as installed within inlet piping 202 and outlet piping 204 for water system piping. In the configuration of FIG. 2A, inlet channel 124 and outlet channel 126 are symmetrical mirror images. FIG. 2B illustrates an enlarged portion 250 of flow path geometry 200 of FIG. 2A. More particularly, portion 250 is a radial slice of outlet channel 126 taken around an axis C to provide a 2D axisymmetric model.

According to implementations described herein, inlet channel 124 and outlet channel 126 may be configured with a non-linear taper (e.g., extending longitudinally in the direction of axis C) that incorporates a square root function.

FIG. 2B provides an enlarged view of a portion of outlet channel 126 illustrated in FIG. 2A. In the example of FIGS. 2A and 2B, outlet channel 126 may incorporate a square root function to define a non-linear shape of taper 156. Taper 156 may be defined by the equation $$y_c = y_{cI} - \left[(y_{cI} - y_{cO}) * \sqrt{\frac{x_c}{L}}\right] \quad (1)$$

where $y_c$ is the radial/height distance from axis C at any point along length L, $y_{cI}$ is the maximum height at the outlet channel 126, $y_{cO}$ is the minimum height at the inlet or start of taper 156, L is the axial taper length, $x_c$ is the axial distance from the end of taper 156 to the location corresponding to $y_c$.

Taper 156, when applied in a three-dimensional (3D) configuration around axis C, may provide a linear change in velocity for fluid flowing through outlet channel 126, since in a conduit (such as outlet channel 126) the velocity is proportional to the area of the conduit for a non-compressible fluid. By comparison, a conventional straight taper (e.g., shown with a dotted line as straight taper 206) produces a non-linear velocity profile. The linear change in the velocity profile through outlet channel 126 provides for constant acceleration leading into measuring channel 102 and reduces energy loss during the transition, which equates to a reduction in head loss exiting measuring channel 102.

While the example of FIGS. 2A and 2B describe taper 156 in terms of a square root function, in other implementations, taper 156 may be defined more generally as a taper including an inverse function of a parabola. Additionally, or alternatively, taper 156 may be described as parabolic arc or a curved taper without a fixed radius.

According to another example, taper 156 may be defined in terms of a fourth root function. For example, using the same variables defined in equation (1) above, the shape of taper 156 may be defined by the equation, $$y_c = \left[\frac{x_C}{L}(y_{cI}^{-4} - y_{cO}^{-4}) + y_{cO}^{-4}\right]^{-1/4}. \quad (2)$$

Thus, the taper of equation (2) may provide a substantially constant velocity change with time (e.g., substantially constant acceleration or deceleration).

Figure 3:
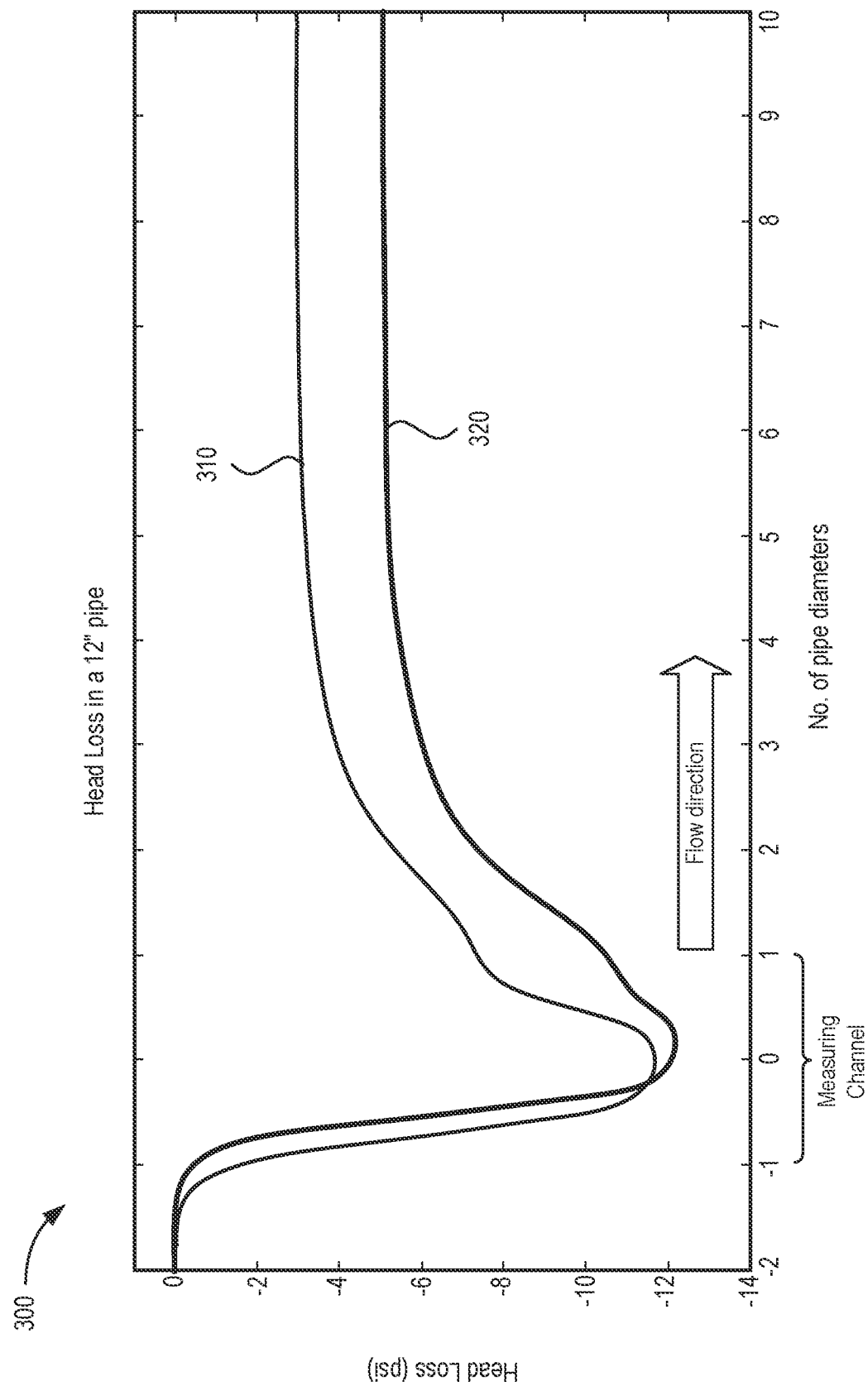
FIG. 3 is graph illustrating simulated head loss values for the water meter assembly of FIG. 1.

FIG. 3 is a graph 300 illustrating a comparison of simulated head loss values for a water meter assembly using a square root taper and a conventional straight taper. Simulation data in FIG. 3 uses a water meter assembly for a 12-inch (30.48 cm) diameter piping system with turbulent flow and a flow rate of 8000 gallons-per-minute (gpm) (30283 liters-per-minute).

Data line 310 illustrates simulated head loss values for flow path geometry 200 illustrated in FIG. 2A. Data line 320 illustrates simulated head loss values for the same flow path geometry, except with a water meter assembly that includes a straight taper (e.g., similar to straight taper 206) for both the inlet and outlet channels. Simulation data in graph 300 shows a substantial drop in head loss from a straight taper (e.g., line 320 data) to a square root taper (e.g., line 310 data). For the particular conditions with 12-inch (30.48 cm) diameter piping and a flow rate of 8000 gpm (30283 liters-per-minute), head loss at 10 pipe diameters (e.g., using the dimeter of the water piping system) is approximately 5 pounds per square inch (psi) (34.47 kPa) for the straight taper, as illustrated at line 310. Using the same basic flow path geometry and flow rates, a head loss of about 3 psi at 10 pipe diameters is achieved using the square root taper, as illustrated at line 310. Thus, given a head loss requirement of 4 psi for flow path geometry 200 of FIG. 2A, a change from a straight taper to a square root taper effectively provides a design that complies with head loss specifications.

Figure 4A:
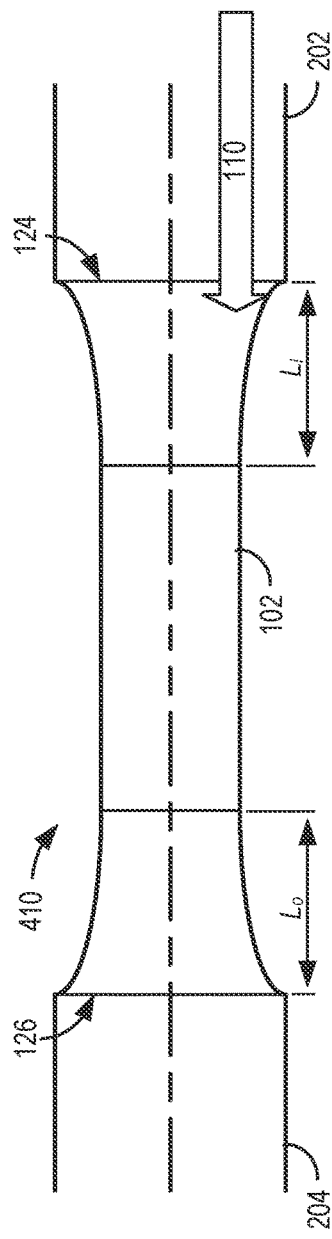
FIGS. 4A-4C are illustrations of different flow path geometries for the water meter assembly of FIG. 1, according to different implementations.
Figure 4B:
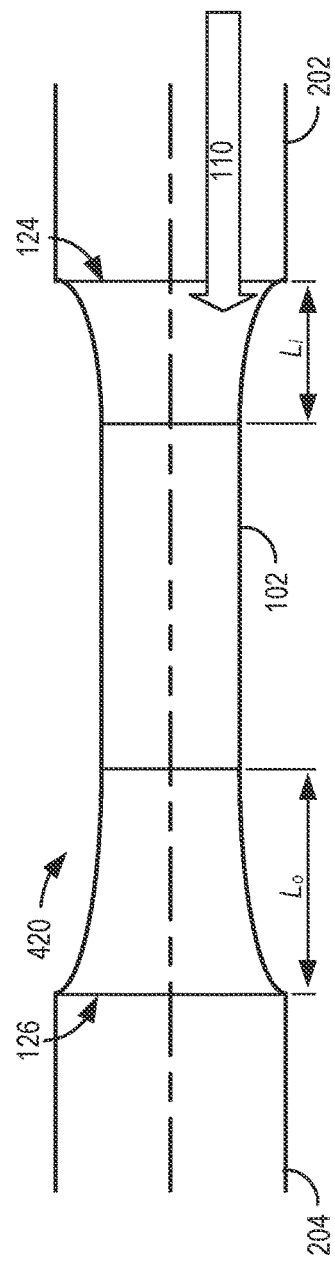
Figure 4C:
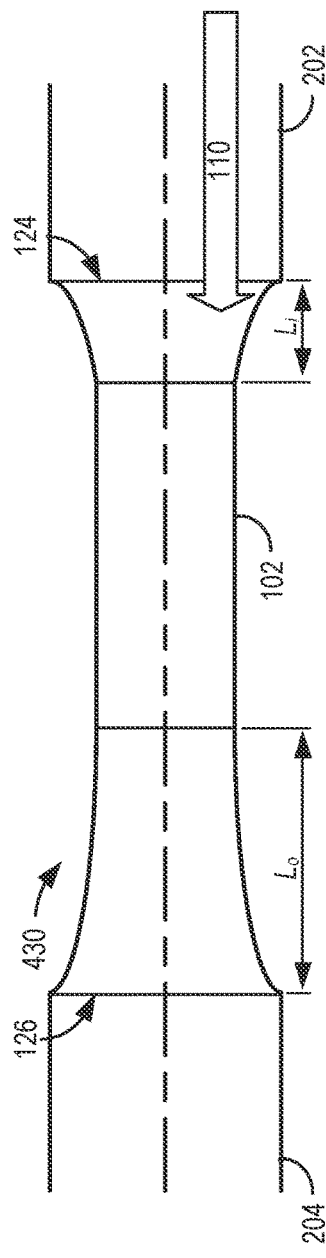

FIGS. 4A-4C illustrate different flow path geometries for water meter assembly 100. Assume in the examples of FIGS. 4A-4C that the axial length of measuring channel 102 is constant and that the distance between inlet piping 202 and outlet piping 204 is constant.

FIG. 4A shows a flow path geometry 410 with measuring channel 102 centered between inlet channel 124 and outlet channel 126. Thus, in FIG. 4A, the length $L_i$ of inlet channel 124 and the length $L_o$ of outlet channel 126 are equal. As an example, in the configuration of FIG. 4A, length $L_i$ and length $L_o$ may both equal approximately 4 inches (10.16 cm) for a water system using 12-inch (30.48 cm) diameter piping.

FIG. 4B shows a flow path geometry 420 with measuring channel 102 located slightly closer to inlet channel 124 than outlet channel 126. Thus, in FIG. 4B, the length $L_i$ of inlet channel 124 is shorter than the length $L_o$ of outlet channel 126. As an example, in the configuration of FIG. 4B, length $L_i$ may be approximately 3 inches (7.62 cm) and length $L_o$ may be approximately 5 inches (12.7 cm).

FIG. 4C shows a flow path geometry 430 with measuring channel 102 shifted even closer to inlet channel 124 than outlet channel 126. Thus, in FIG. 4C, the length $L_i$ of inlet channel 124 is significantly shorter than the length $L_o$ of outlet channel 126. As an example, in the configuration of FIG. 4C, length $L_i$ may be approximately 2 inches (5.08 cm) and length $L_o$ may be approximately 6 inches (15.24 cm).

Figure 5:
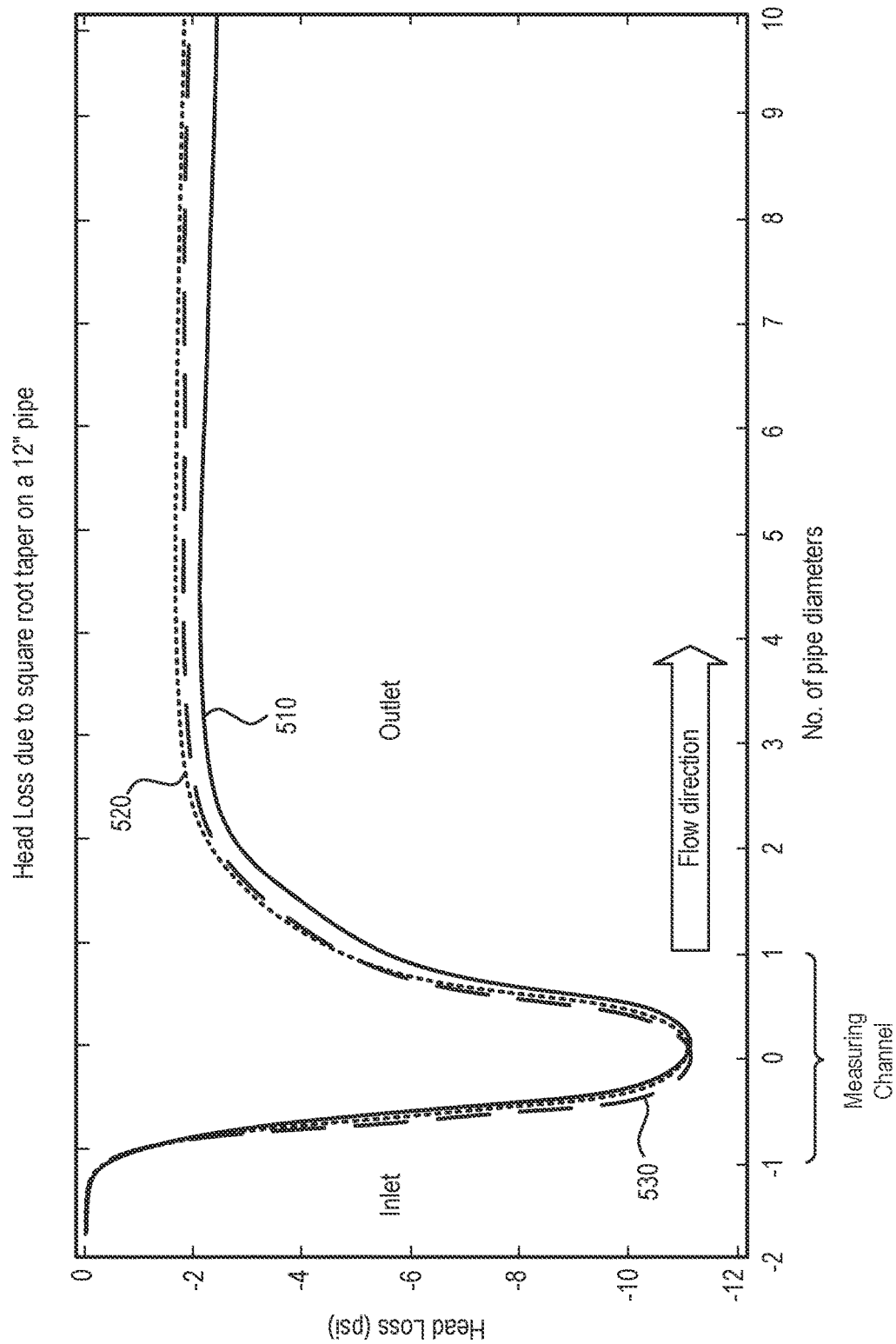
FIG. 5 is graph illustrating simulated head loss values for flow path geometries of FIGS. 4A-4C.

FIG. 5 is a graph 500 illustrating a comparison of simulated head loss values for a water meter assembly using the configurations of FIGS. 4A-4C. Similar to FIG. 3 described above, simulation data in FIG. 5 uses a water meter assembly for a 12-inch (30.48 cm) diameter piping system with turbulent flow and a flow rate of 8000 gpm (30283 liters-per-minute).

Data line 510 illustrates simulated head loss values for the flow path geometry 410 illustrated in FIG. 4A. Data line 520 illustrates simulated head loss values for the flow path geometry 420 illustrated in FIG. 4B. Data line 530 illustrates simulated head loss values for the flow path geometry 430 illustrated in FIG. 4C. As shown in graph 500, the transition inside the flow tube (e.g., measuring channel 102) from loss to gain shifts to the left due to the offset in FIGS. 4B and 4C.

As shown by data line 510, head loss at 10 pipe diameters is approximately 2.5 psi in the configuration of FIG. 4A, with equal length inlet channel 124 and outlet channel 126. As shown by data lines 520 and 530, head loss at 10 pipe diameters is approximately 2 psi when an offset configuration is used, such as either of the configurations in FIGS. 4B and 4C. Thus, the longer transition at outlet channel 126 used in FIGS. 4B and 4C allows the water flow to regain more pressure than a symmetrical configuration, such as shown in FIG. 4A.

As illustrated by data lines 520 and 530, generally, the head loss improvement becomes less significant as the amount of offset of measuring channel 102 increases. In one example, offset of measuring channel 102 may provide a length $L_o$ that is at least 10 percent greater than a length $L_i$.

In other implementations, offset of measuring channel 102 may provide a length $L_o$ that is at least 25 percent greater than a length $L_i$.

Figure 6:
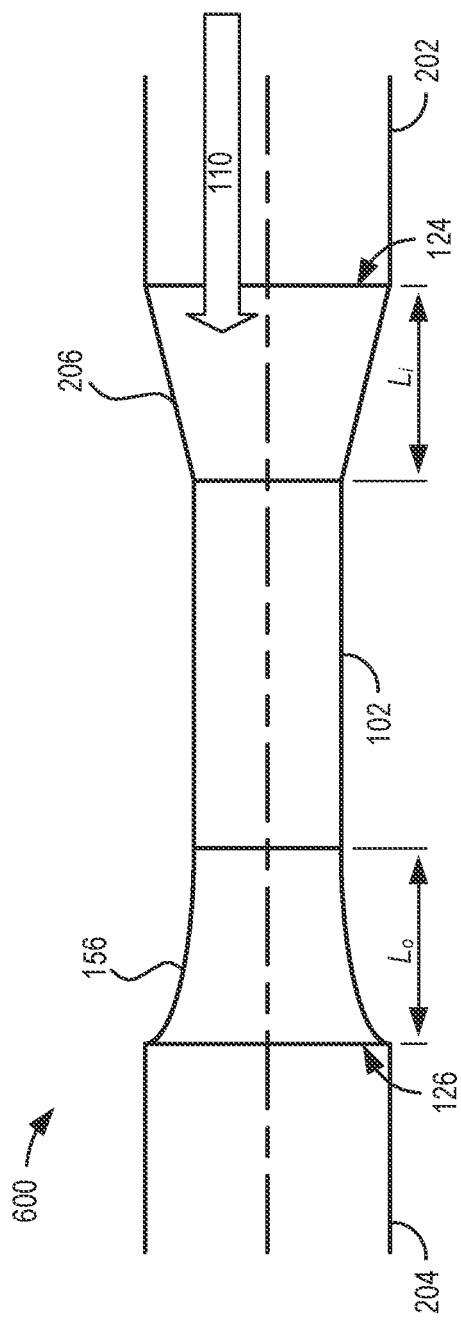
FIG. 6 is an illustration of another flow path geometry for the water meter assembly of FIG. 1, according to another implementation.

FIG. 6 illustrates another flow path geometry 600 for water meter assembly 100, according to another implementation. In the configuration of FIG. 6, inlet channel 124 may include a straight taper 206 and outlet channel 126 may include a non-linear taper 156. In one implementation of flow path geometry 600, measuring channel 102 may cen-tered between inlet channel 124 and outlet channel 126, such that the length $L_i$ of inlet channel 124 and the length $L_o$ of outlet channel 126 are equal. In other implementations of flow path geometry 600, measuring channel 102 may be offset, such that the length $L_i$ of inlet channel 124 and the length $L_o$ of outlet channel 126 are different.

Although FIG. 6 illustrates a flow path geometry with a straight taper 206 for inlet channel 124, in other implementations inlet channel 124 may use a different taper shape, such as a circular curve or a parabolic arc derived from a different function than is used for taper 156. In still another implementation, flow path 110 for flow path geometry 600 may be reversed, such that configurations of inlet channel 124 and outlet channel 126 are effectively switched. That is, inlet channel 124 may include a non-linear taper and outlet channel 126 may include a linear taper.

Figure 7B:
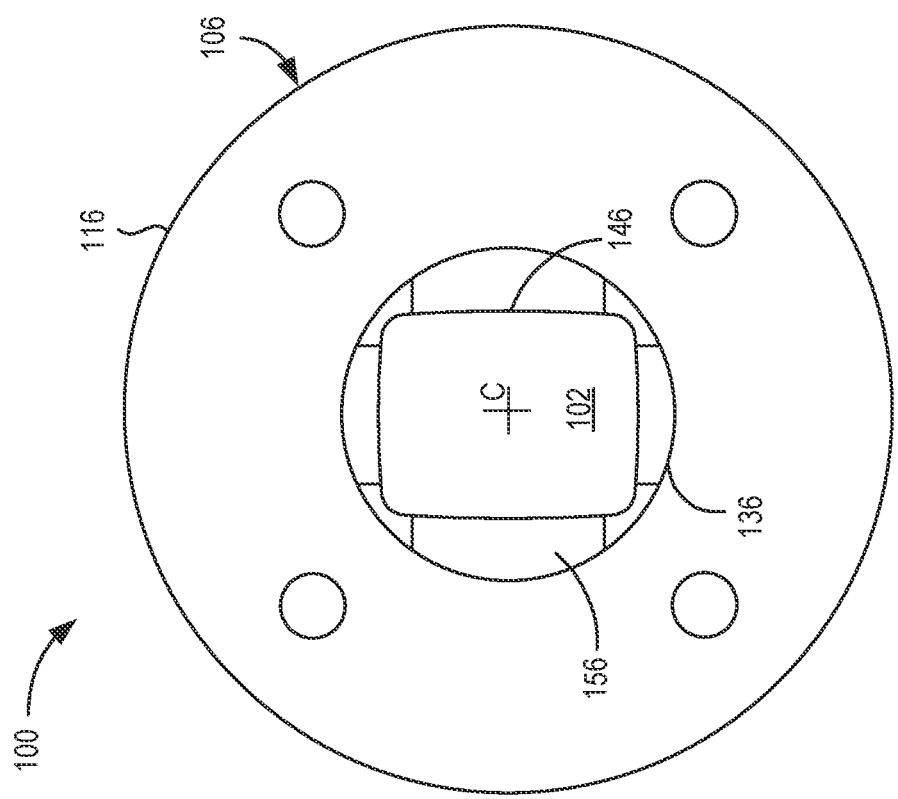
FIGS. 7A and 7B are end views of the water meter assembly of FIG. 1, according to different implementations.
Figure 7A:
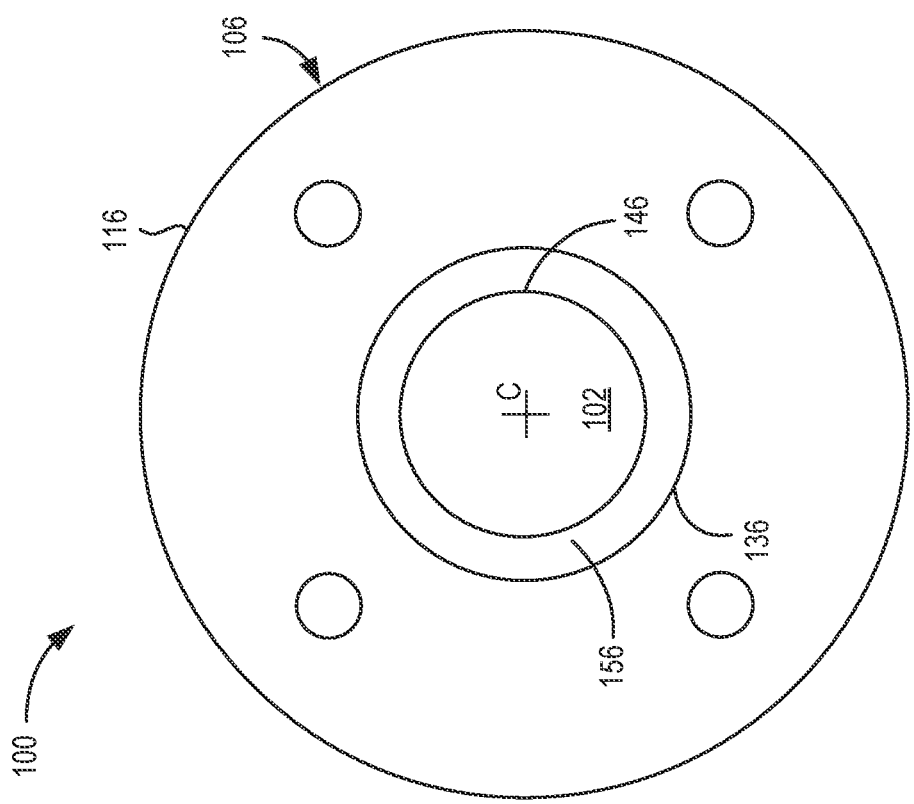

FIGS. 7A and 7B are end views of water meter assembly 100, showing outlet section 106, according to different exemplary configurations. In the configuration of FIG. 7A, measuring channel 102 has a substantially circular cross section. In the configuration of FIG. 7B, measuring channel 102 has a substantially rectangular cross section.

As shown in FIG. 7A, taper 156 may be applied such that a radial slice of outlet channel 126, such as shown in portion 250 of FIG. 2B, is substantially the same for 360 degrees around axis C. That is, in the configuration of FIG. 7A, the shape of taper 156 between end 136 and end 146 may be the same for any radial slice.

As shown in FIG. 7B, taper 156 may be applied such that the shape of taper 156 between end 136 and end 146 may be different for different radial slices of outlet channel 126 around axis C. According to an implementation, the same equation may be applied to calculate the shape of taper 156 for each radial slice, but with different minimum heights for different slices. For example, applying equation (1) described above in connection with FIG. 2B, the term $y_{c0}$ may be different for different radial slices. Thus, systems and methods described herein may be applied to transitions for measuring channels with substantially rectangular cross-sections or other non-circular cross sections.

Figure 8:
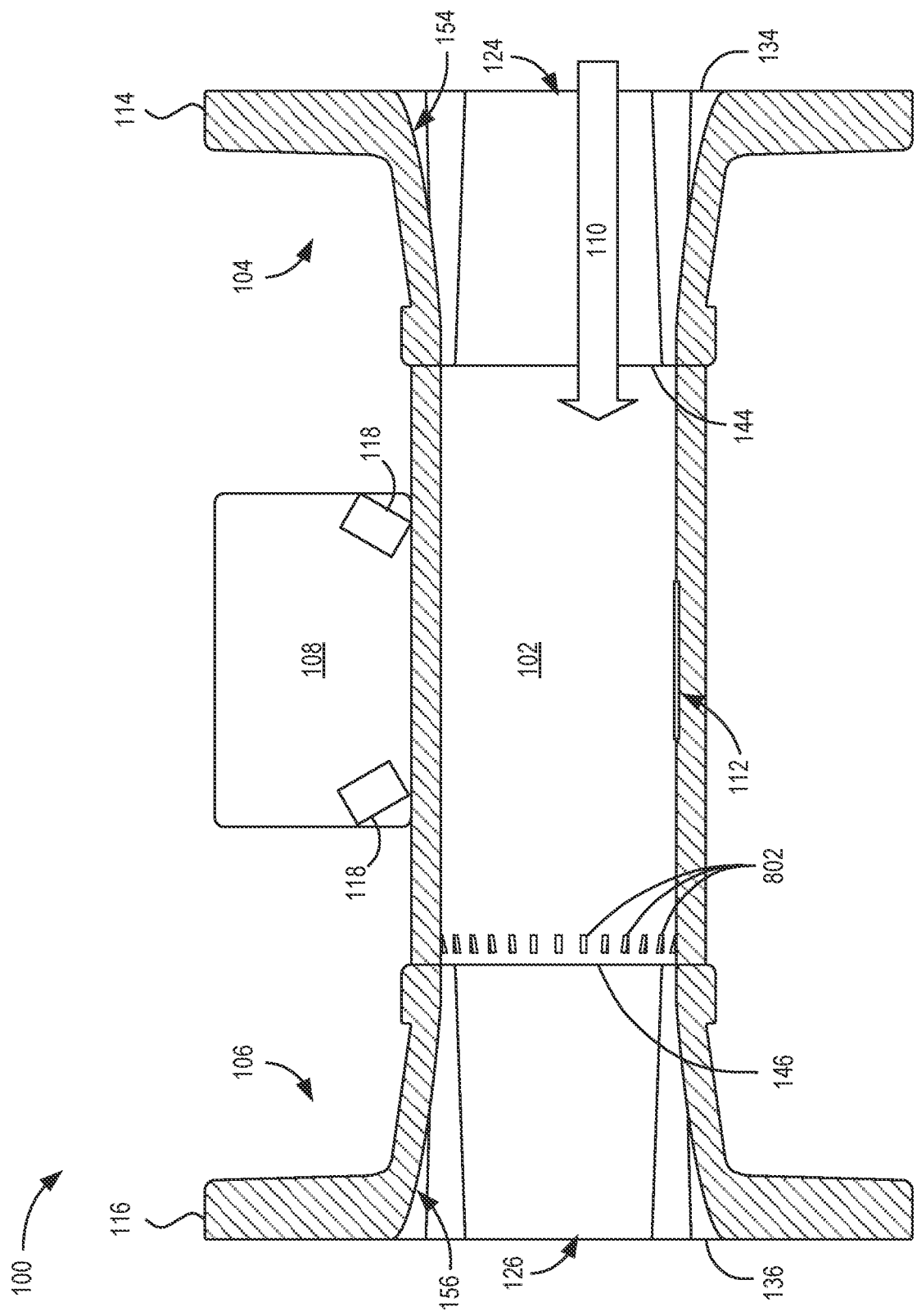
FIG. 8 is a longitudinal cross-sectional view of a water meter assembly according to an implementation that includes vortex generators.

FIG. 8 is a longitudinal cross-sectional view of a water meter assembly 100, according to another implementation. In the configuration of FIG. 8, vortex generators 802 may be included downstream of electronics module 108 and/or reflective surface 112 near the downstream end (e.g., opposite end 146) of measuring channel 102. Vortex generators 802 may be inserted to reduce head loss at high flow. According to an implementation, vortex generators 802 may be incorporated with one of the non-linear inlet/outlet taper configurations described above. According to another implementation, vortex generators 802 may be used without a non-linear taper.

While FIG. 8 illustrates one type of vortex generator 802 that employs an array of small inwardly raised ramps, in other implementations, vortex generators 802 may have a different form. For example, in other implementations, vortex generators 802 may include different element arrangements, different element orientations, and different element shapes for vortex generators 802. Additionally, or alternatively, in other implementation, a vortex generator 802 may include a single feature or part that affects a substantial portion of the flow exiting measuring channel 102.

Figure 9A:
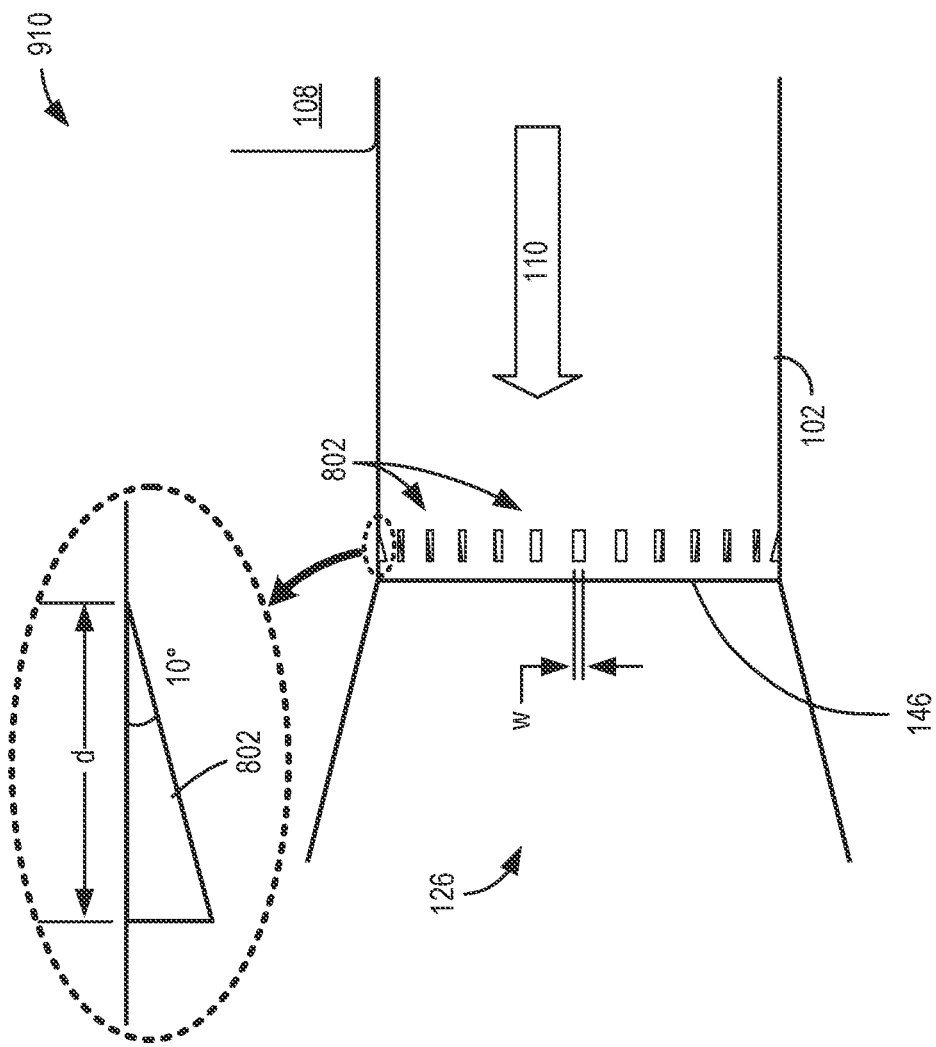
FIGS. 9A-9C are illustrations of different vortex generator arrangements of the water meter assembly of FIG. 8.

FIG. 9A is a two-dimensional schematic of a portion of water meter assembly 100 illustrating an arrangement 910 of vortex generators 802 around a circumference of measuring channel 102. Each of vortex generators 802 may generally form a wedge-shaped protrusion into a fluid flow path. As shown in FIG. 9A, vortex generators 802 may extend from a wall of measuring channel 102 into the fluid flow path. For example, vortex generators 802 may be molded or formed into the wall of measuring channel 102.

Vortex generators 802 may have different dimensions depending on the size of measuring channel 102. According to one implementation, each vortex generators 802 for measuring channel 102 in a 12-inch (30.48 cm) diameter pipe may include a longitudinal distance, d, of 0.3 inches (7.62 mm) and a radial width, w, of 0.1 inch (2.54 mm). The vortex generators 802 may be evenly spaced around the interior surface measuring channel 102. For example, measuring channel 102 in a 12-inch (30.48 cm) diameter pipe may accommodate 28 evenly spaced vortex generators 802.

Figure 9B:
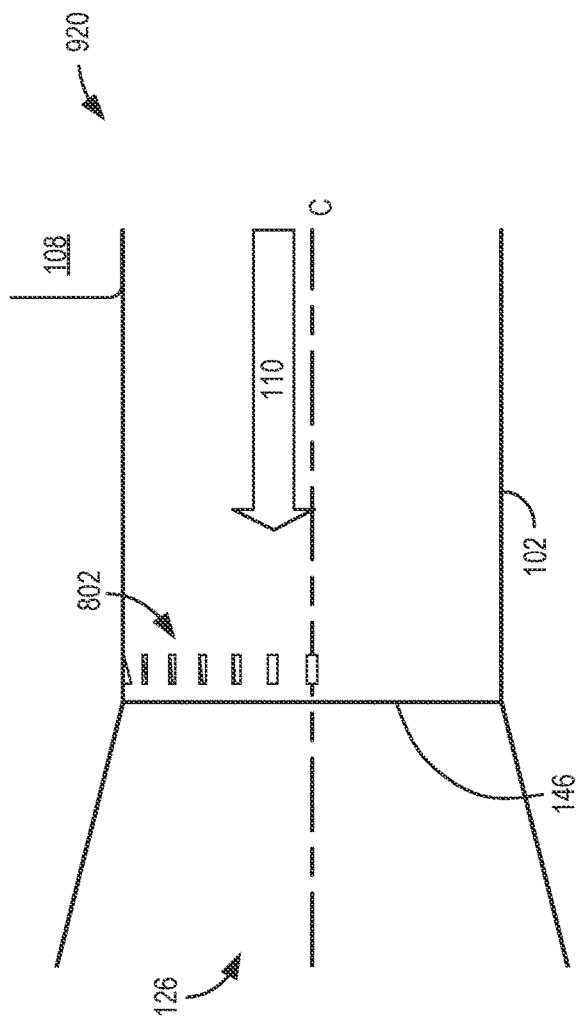
Figure 9C:
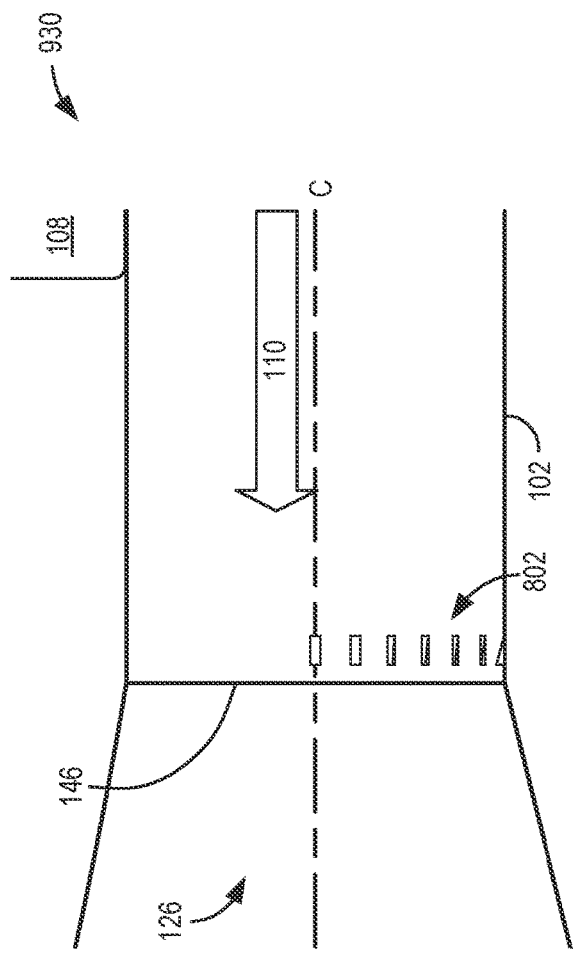

While distribution of vortex generators 802 around an internal circumference of measuring channel 102 provides reduced head loss at high flow rates, other arrangements of vortex generators 802 may also provide reduced head loss. For example, as shown in FIG. 9B, vortex generators 802 may be positioned in an arrangement 920 around a top half of the internal circumference of measuring channel 102. As shown in FIG. 9C, vortex generators 802 may be positioned in an arrangement 930 around a bottom half of the internal circumference of measuring channel 102. In other implementations, measuring channel 102 may include other arrangements of vortex generators 802 (e.g., bottom third of circumference, top third, etc.).

Figure 10:
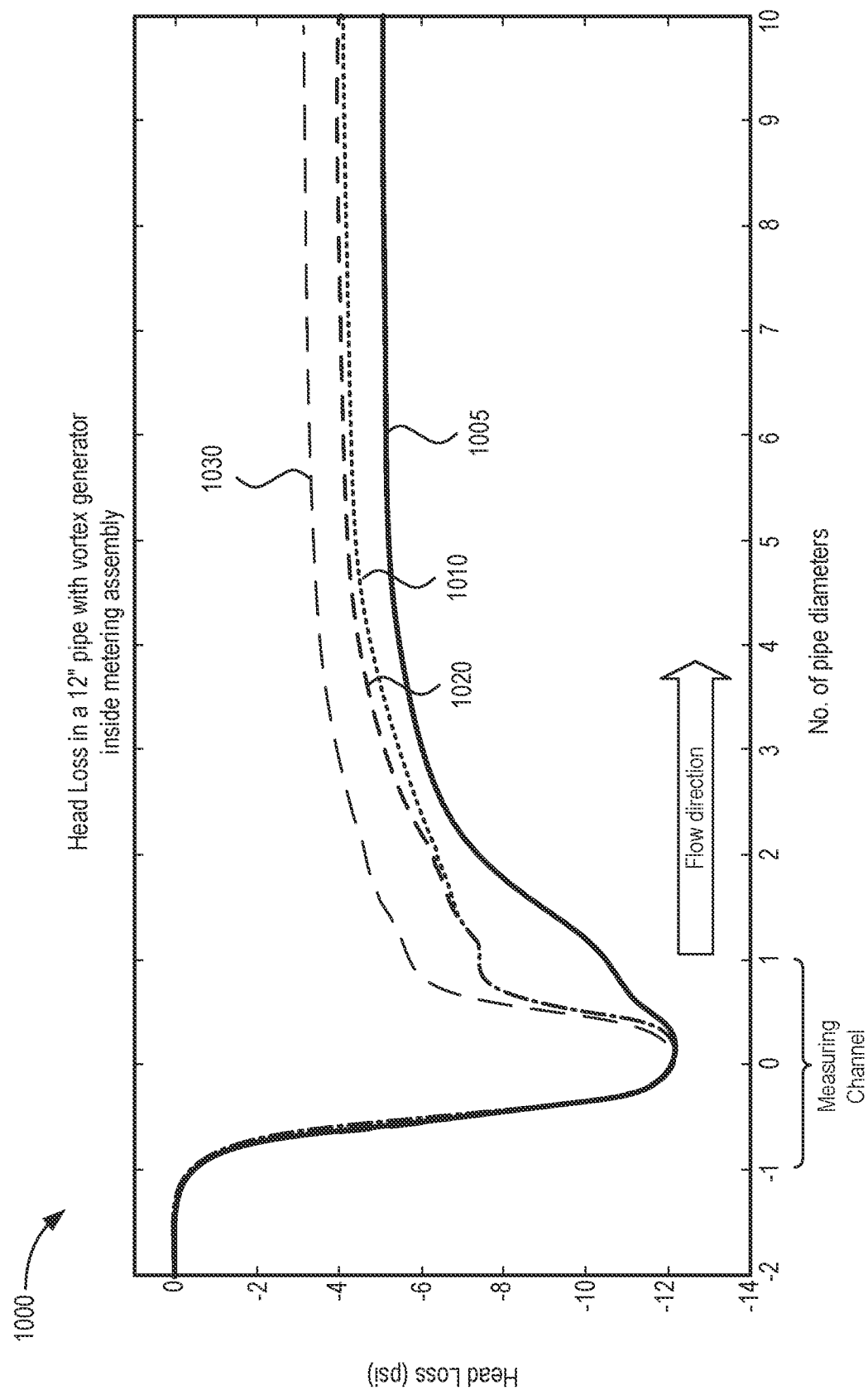
FIG. 10 is a graph illustrating simulated head loss values for the vortex generator arrangements of FIGS. 9A-9C.

FIG. 10 is a graph 1000 illustrating a comparison of simulated head loss values for a water meter assembly using the configurations of FIGS. 9A-9C. Similar to FIGS. 3 and 5 described above, simulation data in FIG. 10 uses a water meter assembly for a 12-inch (30.48 cm) diameter piping system with turbulent flow and a flow rate of 8000 gpm (30283 liters-per-minute).

Data line 1005 illustrates simulated head loss values for a flow path geometry with no vortex generators 802 in a water meter assembly that includes a straight taper (e.g., similar to straight taper 206) for both the inlet and outlet channels. Data line 1010 illustrates simulated head loss values for the vortex generator arrangement 910 illustrated in FIG. 9A. Data line 1020 illustrates simulated head loss values for the vortex generator arrangement 920 illustrated in FIG. 9B. Data line 1030 illustrates simulated head loss values for the vortex generator arrangement 930 illustrated in FIG. 9C. As shown in graph 1000, each of the different arrangements of vortex generators 802 may reduce separation and bring the head loss down.

As shown by data lines 1010 and 1020, head loss at 10 pipe diameters is approximately 4 psi (27.58 kPa) in the configurations of FIGS. 9A and 9B, which provide notable improvement over the 5 psi (34.47 kPa) head loss (at 10 pipe diameters) of the geometry in with no vortex generators shown by data line 1005. As shown by data line 1030, head loss at 10 pipe diameters is approximately 3 psi (20.68 kPa) when vortex generators 802 were included only on the bottom half of measuring channel 102, such as in FIG. 9C.

In other implementations, vortex generators 802 may be used to similar effect when located along an internal circumference of outlet piping 204 (e.g., FIG. 2A). For example, vortex generators 802 may be positioned immediately downstream or several inches downstream of outlet channel 126. Vortex generators 802 may be combined with any of the non-linear shapes of taper 156 (e.g., FIG. 2B), any of the offset configurations (e.g., FIGS. 4A-4C), and any of cross sectional shapes of measuring channel 102 (e.g., FIGS. 7A-7B) described above to reduce and/or further control head loss.

Systems described herein include a transition interface to or from a measuring element for a metering assembly. The transition interface includes an outlet channel located between a measuring channel and an outlet pipe. The outlet channel has a first cross-sectional shape at a first end of the outlet channel and a second cross-sectional shape at a second end of the outlet channel. The first cross-sectional shape corresponds to a shape of the measuring channel, and the second cross-sectional shape corresponds to a shape of the outlet pipe. The first cross-sectional shape has a smaller area than the second cross-sectional shape. The outlet channel has a non-linear taper forming the outlet channel. The non-linear taper extends longitudinally between the first end and the second end.

The foregoing description of implementations provides illustration and description, but is not intended to be exhaustive or to limit the invention to the precise form disclosed. Modifications and variations are possible in light of the above teachings or may be acquired from practice of the invention.

Use of ordinal terms such as "first," "second," "third," etc., in the claims to modify a claim element does not by itself connote any priority, precedence, or order of one claim element over another, the temporal order in which acts of a method are performed, the temporal order in which instructions are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the articles "a," "an," and "the" are intended to include one or more items. Further, the phrase "based on" is intended to mean "based, at least in part, on" unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A transition interface for a measuring element for a metering assembly, the transition interface comprising:
   an outlet channel configured to be located between a measuring channel and an outlet pipe, the outlet channel including:
      a first cross-sectional shape at a first end of the outlet channel, the first cross-sectional shape corresponding to a shape of the measuring channel,
      a second cross-sectional shape at a second end of the outlet channel, the second cross-sectional shape corresponding to a shape of the outlet pipe, wherein the first cross-sectional shape has a smaller area than the second cross-sectional shape, and
      a first non-linear taper forming the outlet channel, the first non-linear taper extending longitudinally between the first end and the second end,
   wherein the outlet channel provides an unobstructed flow path having a linear change in velocity for water flowing through the outlet channel from the measuring channel to the outlet pipe.

2. The transition interface of claim 1, wherein a shape of the first non-linear taper in a radial slice of the outlet channel is defined by a square root function.

3. The transition interface of claim 1, wherein a shape of the first non-linear taper in a radial slice of the outlet channel corresponds to a parabolic arc.

4. The transition interface of claim 1, wherein a shape of the first non-linear taper in a radial slice of the outlet channel is defined by a fourth root function.

5. The transition interface of claim 1, further comprising:
   an inlet channel configured to be located between the measuring channel and an inlet pipe, the inlet channel including:
      the first cross-sectional shape at a third end of the inlet channel, and
      a third cross-sectional shape at a fourth end of the inlet channel, the third cross-sectional shape corresponding to a shape of the inlet pipe, wherein the first cross-sectional shape has a smaller area than the third cross-sectional shape,
      a second taper forming the inlet channel, the second taper extending longitudinally between the fourth end and the third end.

6. The transition interface of claim 5, wherein the shape of the second taper in a radial slice of the inlet channel is defined by a square root function.

7. The transition interface of claim 5, wherein the shape of the second taper is different than the shape of the first non-linear taper.

8. The transition interface of claim 5, wherein a longitudinal length of the first non-linear taper is greater than a longitudinal length of the second taper.

9. The transition interface of claim 8, wherein the longitudinal length of the first non-linear taper is at least 10 percent greater than the longitudinal length of the second taper.

10. The transition interface of claim 5, wherein the second cross-sectional shape is the same as the third cross-sectional shape.

11. The transition interface of claim 5, wherein the second taper in a radial slice of the inlet channel is linear.

12. The transition interface of claim 1, wherein the first cross-sectional shape is substantially rectangular, and wherein the second cross-sectional shape is substantially circular.

13. The transition interface of claim 1, further comprising:
   the measuring channel configured to be located between the outlet channel and an inlet channel, the measuring channel including:
   a vortex generator arranged at least partly around an interior circumference of the measuring channel.

14. A fluid metering assembly, comprising:
   a measuring channel;
   an inlet channel configured to be located between the measuring channel and an inlet pipe; and
   an outlet channel configured to be located between the measuring channel and an outlet pipe, the outlet channel including:
      a first cross-sectional shape at a first end, the first cross-sectional shape corresponding to a shape of the measuring channel,
      a second cross-sectional shape at a second end, the second cross-sectional shape corresponding to a shape of the outlet pipe, wherein the first cross-sectional shape has a smaller area than the second cross-sectional shape, and
      a first non-linear taper forming the outlet channel, the first non-linear taper extending longitudinally between the first end and the second end,
   wherein the outlet channel provides an unobstructed flow path having a linear change in velocity for water flowing through the outlet channel from the measuring channel to the outlet pipe.

15. The fluid metering assembly of claim 14, further comprising:
   an electronics module including at least one pair of ultrasonic transducers for measuring a flow of water flowing through the measuring channel,
   wherein the measuring channel includes:
      a reflective surface for the at least one pair of ultrasonic transducers, and
      a vortex generator arranged at least partly around an interior circumference of the measuring channel, wherein the vortex generator is located downstream of the reflective surface.

16. The fluid metering assembly of claim 14, wherein the inlet channel includes:
- a third cross-sectional shape at a third end of the inlet channel,
- a fourth cross-sectional shape at a fourth end of the inlet channel, the fourth cross-sectional shape corresponding to a shape of the inlet pipe, wherein the third cross-sectional shape has a smaller area than the fourth cross-sectional shape, and
- a second taper forming the inlet channel, the second taper extending longitudinally between the fourth end and the third end.

17. The fluid metering assembly of claim 16, wherein a shape of at least one of the first non-linear taper or the second taper in a radial slice of the fluid metering assembly is defined by a square root function.

18. The fluid metering assembly of claim 16, wherein a shape of at least one of the first non-linear taper or the second taper in a radial slice of the fluid metering assembly corresponds to a parabolic arc.

19. The fluid metering assembly of claim 16, wherein a longitudinal length of the first non-linear taper is greater than a longitudinal length of the second taper.

20. The fluid metering assembly of claim 14, wherein the first cross-sectional shape is one of substantially rectangular or substantially circular, and wherein the second cross-sectional shape is substantially circular.

\* \* \* \* \*